United States Patent [19]

Kooroki

[11] Patent Number: 4,762,329
[45] Date of Patent: Aug. 9, 1988

[54] SPACER EXPANDER FOR PISTON RINGS

[75] Inventor: Takeo Kooroki, Tokyo, Japan

[73] Assignee: Nippon Piston Ring Co., Ltd., Tokyo, Japan

[21] Appl. No.: 70,700

[22] Filed: Jul. 7, 1987

[30] Foreign Application Priority Data

Jul. 15, 1986 [JP] Japan ................. 61-164688

[51] Int. Cl.⁴ .................................. F16J 9/06
[52] U.S. Cl. .................... 277/139; 277/148; 277/216; 267/1.5
[58] Field of Search ................ 277/138–140, 277/148, 149, 151, 157, 216; 267/1.5

[56] References Cited

U.S. PATENT DOCUMENTS

| 2,789,872 | 4/1957 | Olson | 277/139 |
| 3,358,988 | 12/1967 | Vossieck | 277/139 X |
| 3,384,383 | 5/1968 | Wiemann et al. | 267/1.5 X |

FOREIGN PATENT DOCUMENTS

| 917129 | 1/1963 | United Kingdom | 277/139 |
| 937643 | 9/1963 | United Kingdom | 277/139 |

Primary Examiner—Robert S. Ward
Attorney, Agent, or Firm—Birch, Stewart, Kolasch & Birch

[57] ABSTRACT

A spacer expander adapted for use in an oil ring assembly of an internal combustion engine comprising a split annular shaped spring body containing a plurality of lugs extending axially from the body to bear on a single rail or double side rails, the body having a sufficiently thick cross-section to exert a radial expansive force on the side rail and cause it to follow the inner surface of the engine cylinder even if the cylinder is distorted at high speed running. The lug is thinner in thickness at least at its root portion than the body and is elastically bendable without affecting the body. Upon inclination of the piston to the cylinder, the side rail is inwardly biased by the cylinder to push a part of the lugs. However, the lugs can elastically bend independently from the body and from the other part of the lugs with the result that the outer radial face of the side rail is always maintained in operative contact with the inner surface of the cylinder.

7 Claims, 3 Drawing Sheets

SPACER EXPANDER FOR PISTON RINGS

BACKGROUND OF THE INVENTION

The present invention relates to a spacer expander of an oil ring utilized for an internal combustion engine and more particularly to a spacer expander constructed from a strip of metal and composed of a split annular spring body and lugs projected axially from the body to hold a side rail in contact with the cylinder wall of the engine.

A spacer expander is generally assembled with a pair of side rails into an oil ring. The spacer expander comprises a split annular spring body when its opposite ends are in contact. The body is formed with a plurality of alternate corrugations to provide a radial expansive force. The inward corrugations are provided with lugs inclined slightly in a direction radially inward of the body. The lugs form a conical surface to engage the inner radial face of the side rail and bias the rail outwardly against the cylinder wall of the engine. The spacer expander is manufactured by blanking a strip of steel, so that the thickness of the lug is uniform and similar to that of the body.

The spacer expander as disclosed in U.S. Pat. No. 3,140,096 is provided with lugs having no uniform thickness. The lug extends axially from the circular body and is chamfered on its outward face to form a conical surface together with the others. The angle of chamfer is in the range of 7 degrees. The lug is also similar in thickness at its root portion to the body.

The known spacer expander is formed with lugs each being the same in cross-sectional thickness at least at the root thereof as the body, thus the root is too rigid to elastically bend. When a part of the lugs are inwardly biased by the side rail, the lugs cause the humps connected therewith to displace inwardly therewith. This leads to an increase of oil consumption in an internal combustion engine under an engine brake operation in which the piston easily swings around the piston pin and easily inclines to the cylinder. Upon the inclination of the piston, one of the upper and lower side rails strongly pushes a part of the lugs inwardly. Then, the body is displaced inwardly to permit the separation of the outer end of the other side rail from the cylinder wall, resulting in a reduction of the oil scraping effect because the other side rail is separated from the cylinder wall and free from oil scraping. The reduction in the oil scraping effect causes a problem of more excessive oil consumption than normally need. Especially during the engine braking, piston readily oscillates whereby the oil consumption increases much more.

On the other hand, a thicker body is required so that a sufficient radial expansive force can be exerted on the side rail in a manner such that the side rail is caused to follow the inner surface of the cylinder at high speed operations when the cylinder is somewhat distorted. However, the more the thickness of the spacer expander is thickened, the more the oil consumption increases during engine braking.

An object of the present invention is to provide an improved spacer expander by which the side rail is always in operative contact with the inner surface of the cylinder even when the piston inclines to the cylinder at engine brake running.

Another object of the present invention is to provide an improved spacer expander by which the side rail well follows the inner surface of the cylinder even when the cylinder is deformed at high speed running.

A further object of the present invention is to provide an improved spacer expander with a thickness to exert a sufficient radial expansive force on the side rail.

A still further object of the present invention is to provide an improved spacer expander capable of reducing the oil consumption at engine brake running.

According to the present invention, the improved spacer expander is constructed from a strip of metal to form a split annular shaped spring body when its opposite ends are in contact and assembled with a single or double side rails into an oil ring assembly. The body is similar in cross-sectional thickness to the original strip of metal and formed with a plurality of lugs for bearing engagement with the inner radial face of the side rail. The lug is thinner in cross-sectional thickness at least at its root portion than the body so that it is elastically easily bendable when it is inwardly biased by the side rail. The lug may be thinned uniformly or partly to have its root portion thinner than the body. The body can have a thickness required to exert a sufficient radial expansive force on the side rail and cause the side rail to follow the inner surface of the cylinder at high speed running in which the cylinder is distorted. Machining is available for manufacturing a spacer expander with uniformly or partly thinned lugs after press-working of a steel strip with a uniform thickness. However, it is preferable to eliminate the machining by utilizing press-working of the off-shaped drawn steel strip having beforehand a thinned section for the thin root portion.

In a preferred embodiment, the annular body is radially corrugated to form the inwardly extending humps and outwardly extending humps. Each inwardly extending hump is formed at its upper and lower crest with upper and lower lugs of which the cross-sectional thickness is thinner than that of the hump. The body is assembled with upper and lower side rails and set in a piston ring groove in a piston. When the piston inclines to the cylinder wall, either of the upper and lower side rails biases a part of the lugs inwardly. The thin lug can elastically bend independently from the body whenever it is inwardly biased by the rail, so that the body remains unmoved. This offers an advantage in that the upper and lower side rails are always in contact with the cylinder wall, even when the piston inclines to the cylinder wall. Therefore, whenever the piston oscillates, during engine braking, upper and lower side rails are always in contact with the internal surface of the cylinder and perform a sufficient oil scraping operation, which consequently limits increases in oil consumption. The thickness of the body or spacer expander can be determined in a manner that it exerts a sufficient radial expansive force on the upper and lower side rails and causes them to follow the cylinder wall at high speed running in which the cylinder is deformed.

Other objects and advantages will become apparent from the following description taken in connection with the accompanying drawings.

BRIEF DESCRIPTION OF THE DRAWINGS

The present invention will become more fully understood form the detailed description given hereinbelow and the accompanying drawings which are given by way of illustration only, and thus are not limitative of the present invention, and wherein.

DETAILED DESCRIPTION OF PREFERRED EMBODIMENTS

Figure 1:
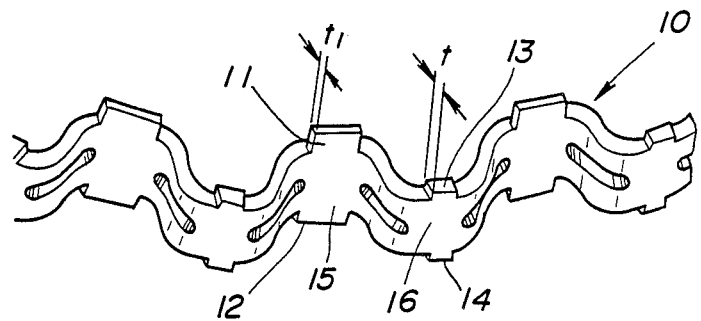
FIG. 1 is a fragmentary perspective view of the spacer expander according to the present invention.

Referring now to FIG. 1, the spacer expander, according to the present invention, has a split annular shaped spring body 10 constructed from a non-illustrated steel strip which is partly thinned by drawing or the like. The body 10 is radially corrugated by press-working to form the inwardly extending humps 15 and outwardly extending humps 16. The outwardly extending humps 16 are formed at the crest thereof with upper and lower shoulders 13 and 14. The inwardly extending humps have the upper and lower lugs 11 and 12 located at the crest of the inwardly extending humps 15. The lugs 11 and 12 extend axially from the inner humps 15. The body 10 has a cross-sectional thickness t similar to that of the original steel strip except the lugs 11 and 12, which have a cross-sectional thickness t1 similar to the thinned portion of the strip drawn.

Figure 2:
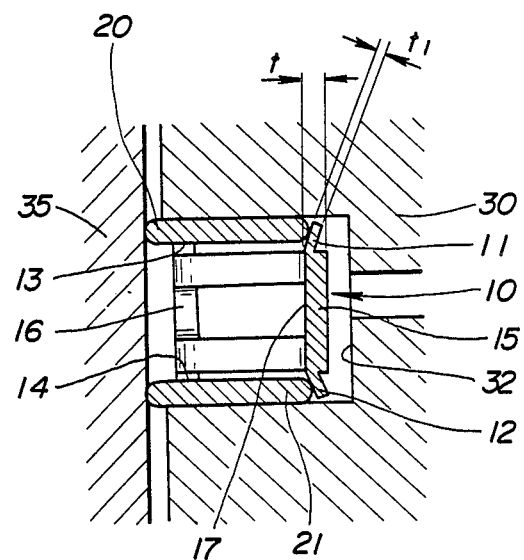
FIG. 2 is an enlarged sectional view, illustrating the relation of the spacer expander of FIG. 1 to the side rails, the piston and the cylinder.

Referring to FIG. 2, the spacer expander 10 is assembled with upper and lower side rails 20 and 21 as an oil ring assembly and mounted in the oil ring groove 32 of the piston 30. The outwardly extending humps 16 with their opposite shoulders 13 and 14 act as spacers for the upper and lower side rails 20 and 21. The outer surfaces of the somewhat inwardly inclined lugs 11 and 12 define upper and lower conical surfaces to engage the respective inner radial faces of the upper and lower side rails 20 and 21. When the oil ring assembly is in operative condition, the radially corrugated body 10 provides a circumferential expanding force in a manner that the conical surfaces of the lugs 11 and 12 exert a radially outwardly directed force and an axially directed force on the side rails 20 and 21. The radial outwardly directed force tends to expand the side rails 20 and 21 thereby exerting a force holding the outer edges of the rail in operative engagement with the internal surface of the cylinder 35. The axial outwardly directed forces tends to hold the outer radial face of each side rail in engagement with the side of the ring groove 32 in the piston 30. The thickness t1 of the lugs 11 and 12 is thinner than the thickness t of the humps 15 so that the lugs 11 and 12 are elastically bendable from their roots connected to the humps 15. On the other hand, the thickness t of the humps 15 and 16 is determined so as to effectively follow the wall of the cylinder 35, even if the wall is deformed at high speed operation.

Figure 3:
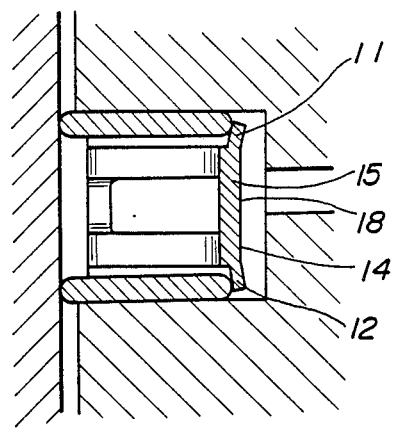
FIGS. 3 to 6 are views of different modifications, respectively, similar to FIG. 2.
Figure 5:
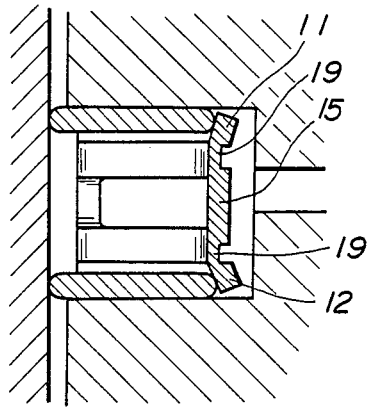
Figure 4:
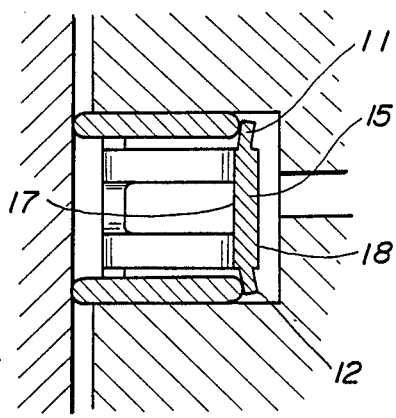

In this embodiment the upper and lower lugs 11 and 12 are on the side toward the outer surface 17 of the inner humps 15. The lugs 11 and 12 can be located on the side toward the inner surface 18 of the inwardly extending humps 15 as shown in FIG. 3 or centrally located between the inner and outer surfaces 17 and 18 of the humps 15 as shown in FIG. 4. Furthermore, as shown in FIG. 5, the lugs 11 and 12 may be similar in cross-sectional thickness to the inner humps 15, except their root portions 19, which are thinner than the other portions.

In the above embodiments, the upper and lower lugs 11 and 12 are identical in length and thickness and symmetrical with each other. However, they are not always required to be so a thus can be different in length and thickness from each other and asymmetrical with respect to each other, if necessary.

Figure 6:
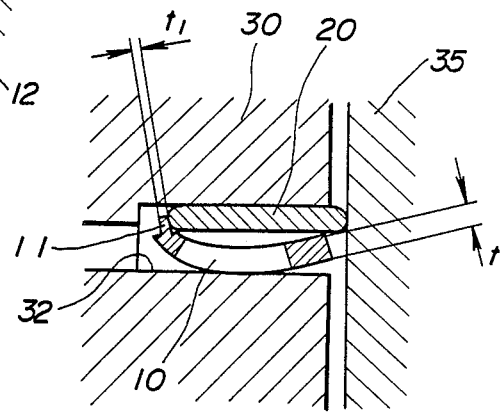

Also the present invention is applicable not only to a spacer expander assembled with upper and lower side rails but also to a spacer expander with a single side rail as shown in FIG. 6. The spacer expander 10 is disposed in the ring groove 32 of the piston 30 to bear on the side rail 20 of which the inner and outer radial faces are respectively engaged with the lugs 11 and the inner surface of the cylinder 35. The thickness t of the spacer expander 10 is determined by considering the deformation of the cylinder 35 while the thickness t1 of the lug 11 is so selected as to be elastically bendable, t1 being always smaller than t.

Figure 7:
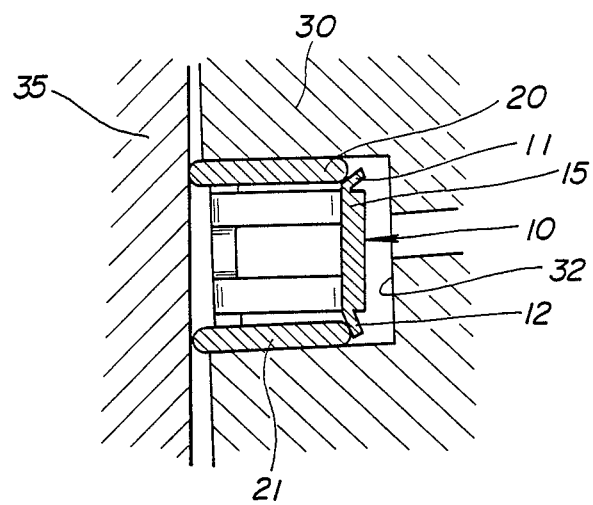
FIG. 7 is a view similar to FIG. 2, illustrating the relation of the spacer expander of FIG. 1 to the side rails, the piston and the cylinder when the piston inclines to the cylinder.

Referring now to FIG. 7, the piston 30 frequently swings during an engine braking operation. Upon inclination of the piston 30, the cylinder 35 forces the upper side rail 20 toward the inside of the groove 32 with the result that the inner radial face of the rail 20 inwardly pushes some of the upper lugs 11. Whenever the lugs 11 are pushed, they are easily bent independently both from the inner humps 15 and from the lower lugs 12 holding the lower side rail 21 in contact with the inner surface of the cylinder 35. It will be understood that some of the lower lugs is elastically bent independently from the respective upper lugs in the non-illustrated opposite side in which the lower side rail is inwardly biased by the cylinder. Thus, the upper and lower side rails 20 and 21 have their outer radial faces in operative contact with the inner surface of the cylinder 35 even if the piston 30 is inclined to the cylinder 35. During the engine braking operation in which the piston most frequently swings about the piston pin, the upper and lower side rails are always in operative contact with the internal surface of the cylinder and perform a sufficient oil scraping operation to prevent an increase of oil consumption due to the inclination of the piston. As the thickness of the spader expander 10 except the upper and lower lugs 11 and 12 is determined by considering the deformation of the cylinder 35 at high speed, the spacer expander 10 causes the upper and lower side rails 11 and 12 to follow the internal surface of the cylinder 35 even at high speed without fail.

The preferred embodiments are of a radially corrugated type. But, it will be appreciated that the present invention is applicable to other types such as an axially corrugated type, an outwardly open type and an inwardly open type as it is.

BENCH TEST

A bench test was conducted by using a piston with three piston rings composed of three rings of first and second compression rings and an oil ring, wherein the first and second rings are the same. The inventive and conventional oil rings were comparatively tested. The inventive was similar in shape to the spacer expander of FIG. 2, the thicknesses t and t1 of the inner humps and the lug being 0.6 mm and 0.3 mm, respectively. The conventional is similar to the inventive except their lugs are similar in thickness of 0.51 mm to the inner humps. The both oil rings were assembled with the same side rail with the radial thickness of 2.6 mm and the axial width of 0.6 mm. The test was made by a four cycle gasoline engine (cylinder diameter: 86 mm, stroke: 86 mm) with a displacement of 2000 cc and water-cooled four cylinders. The test of three hours operation was conducted three times at the following conditions of (A) and (B) to measure the respective oil consumption.

(A) ENGINE BRAKE OPERATION

Rotation: 2,300 rpm
Pressure in suction pipe of engine: −640 mmHg

(B) HIGH SPEED OPERATION

Rotation: 5,600 rpm
Pressure in suction pipe of engine: −120 mmHg

Figure 8:
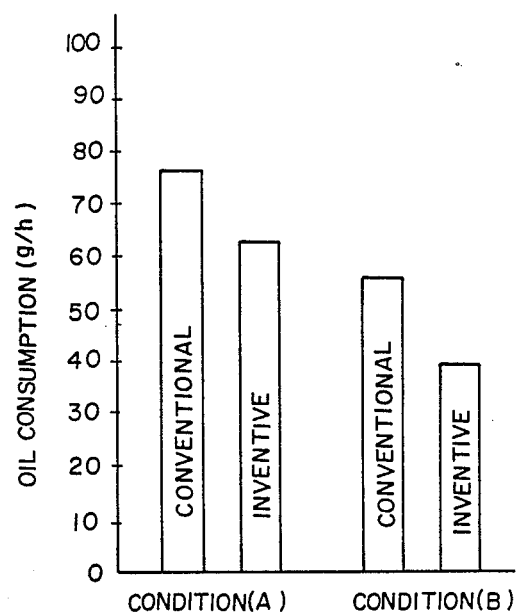
FIG. 8 is a graph showing the amounts of oil consumption in a test engine.

The results as shown in FIG. 8 show that the oil consumption is smaller in the oil ring with the spacer expander of the present invention than the conventional one in either condition of (A) and (B) and that the inventive spacer expander is superior in the sealing performance as compared to the conventional one.

From the foregoing, the spacer expander of the present invention comprises an annular spring body and lugs extending axially from the body to bear on the inner radial face of a side rail. The body has a sufficiently thick cross-section to force the side rail in to following engagement with the internal wall of the cylinder at high speed operation in which the cylinder is somewhat distorted. Each lug has, at least at its root portion, a sufficiently thin cross-section to permit it to elastically bend without affecting the annular spring body, whereby, when the piston somewhat violently swings about the piston pin to incline to the cylinder in high speed or engine brake operation, a part of the lugs can elastically bend independently both from the body and from the other part of the lugs with the result that the outer radial face of the side rail is always kept in operative contact with the inner surface of the cylinder. Therefore, an oil ring assembly which uses the inventive spacer expander prevents an increase of oil consumption in high speed and engine brake operations.

As many apparently widely different embodiments of the present invention may be made without departing from the spirit and scope thereof, it is to be understood that the invention is not limited to the specific embodiments thereof except as defined in the appended claims.

What is claimed is:

1. A spacer expander assembly adapted for engagement with at least one side rail disposed in the oil ring of an internal combustion engine which comprises
a split annular shaped spring body and a plurality of lugs extending axially from said spring body for bearing engagement with the inner radial face of said side rail, each lug having a base portion connected to said body which is thinner in thickness in the cross-sectional radial direction, at least at said base portion where it connects to said body.

2. The spacer expander of claim 1, wherein said lug is uniform in thickness.

3. The spacer expander of claim 1, wherein said lug is disposed on the side toward the inner peripheral surface of said body.

4. The spacer expander of claim 1, wherein said lug is disposed on the side toward the outer peripheral surface of said body.

5. The spacer expander of claim 1, wherein said lug is located between the inner and outer peripheral surfaces of said body.

6. The spacer expander of claim 1, wherein said body is radially corrugated to form inner and outer humps, said lugs extending somewhat inwardly from said inner humps to define a conical surface.

7. The spacer expander of claim 6, wherein said lugs extend oppositely from said inner humps to respectively engage the inner radial surfaces of upper and lower side rails.

* * * * *